United States Patent

[11] 3,622,739

| | | |
|---|---|---|
| [72] | Inventor | Jurg Steffen<br>Zurich, Switzerland |
| [21] | Appl. No. | 12,166 |
| [22] | Filed | Feb. 18, 1970 |
| [45] | Patented | Nov. 23, 1971 |
| [73] | Assignee | Institut Fur Angewandte Physik Der Universitat Bern and Pierres Holding S. A.<br>Bern, Switzerland and Biel, Switzerland |
| [32] | Priority | Feb. 27, 1969 |
| [33] | | Switzerland |
| [31] | | 2968/69 |

[54] DEVICE FOR THE PRODUCTION OF A LASER BEAM FOR DRILLING WATCH JEWELS
10 Claims, 8 Drawing Figs.

[52] U.S. Cl. ................................................. 219/121 L,
 331/94.5
[51] Int. Cl. .................................................... B23k 9/00
[50] Field of Search .......................................... 219/121;
 331/94.5

[56] References Cited
UNITED STATES PATENTS
3,353,115  11/1967  Maiman ..................... 331/94.5
OTHER REFERENCES
Physical Review Vol. 112, No. 6, Dec. 15, 1958, " Infrared and Optical Masers" by A. L. Schawlow and C. H. Townes

*Primary Examiner*—J. V. Truhe
*Assistant Examiner*—Lawrence A. Rouse
*Attorney*—Waters, Roditi, Schwartz & Nissen

ABSTRACT: A laser beam is produced for drilling watch jewels by a resonator and a focusing lens system. The resonator comprises a rod of active material mounted between two planer reflectors and energized by a pulse light source, the spacing between the reflectors being at least 10 times greater than the length of the rod.

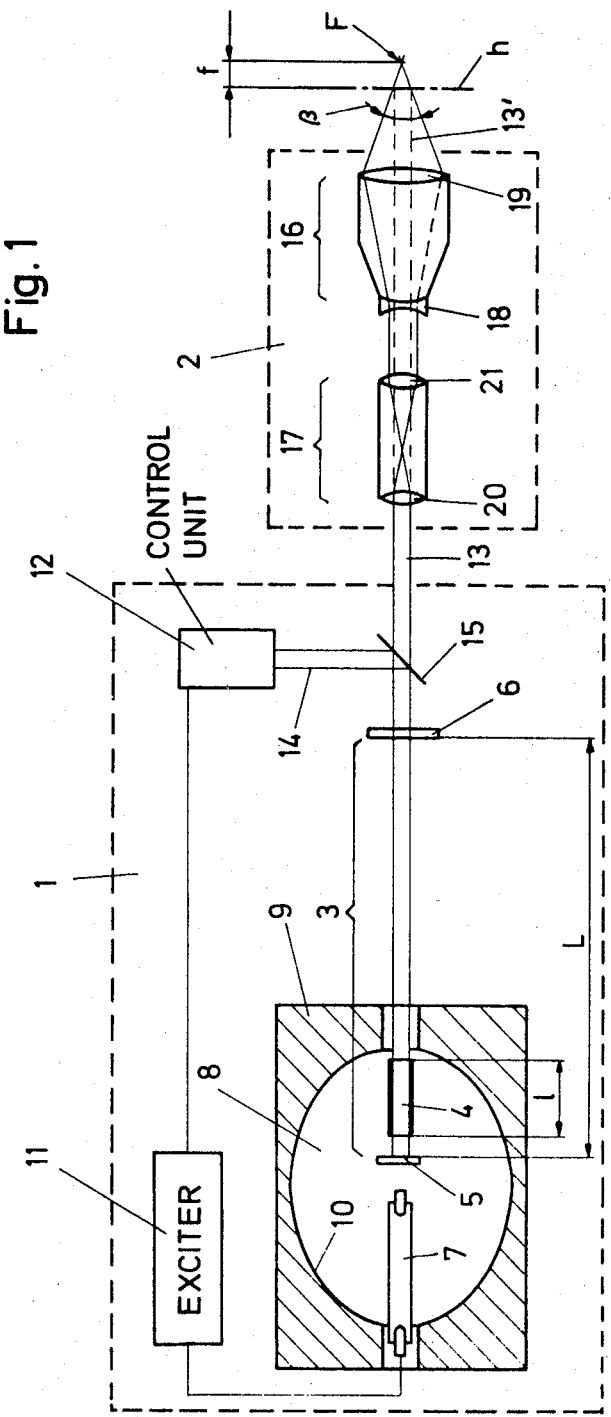

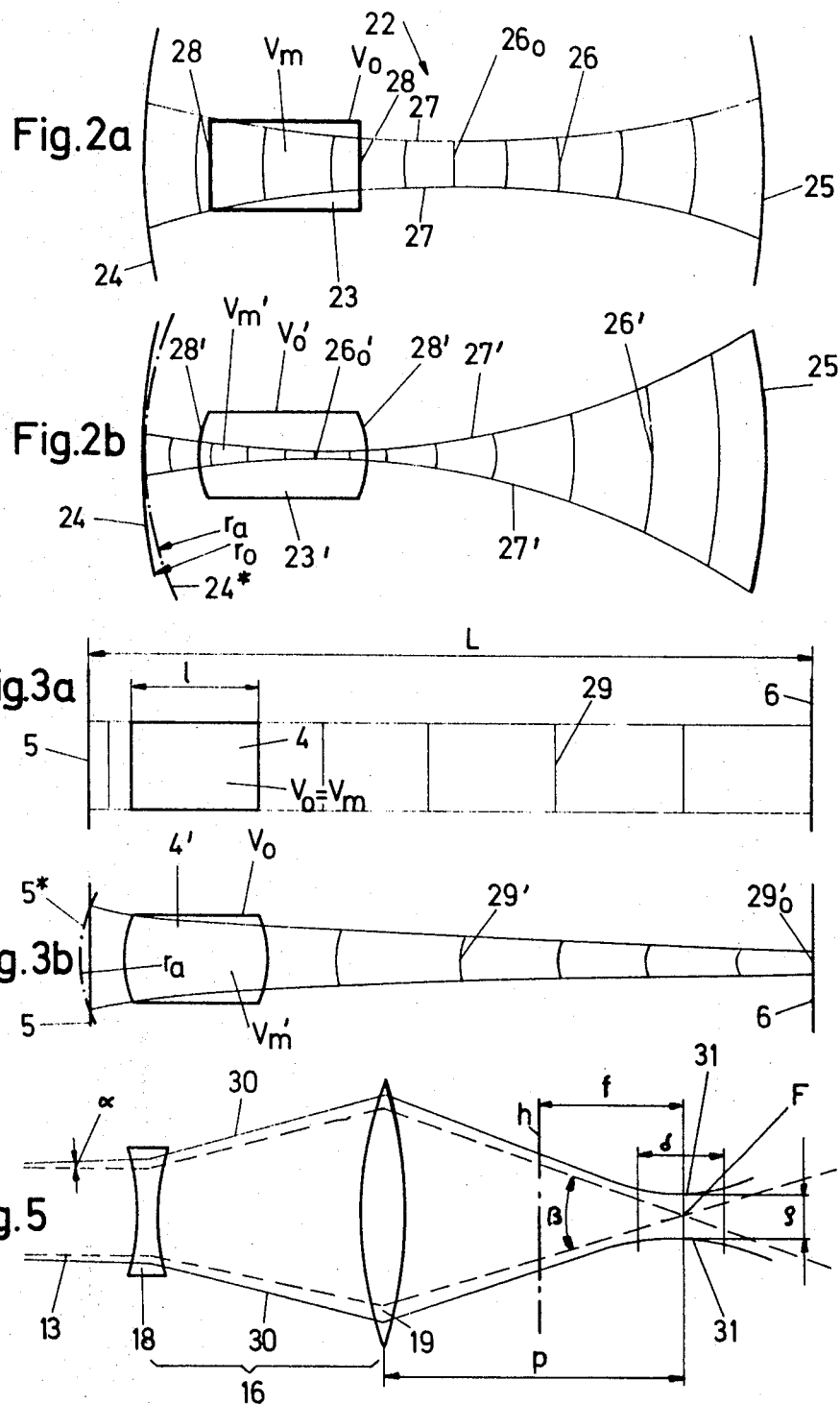

മ3,622,739

DEVICE FOR THE PRODUCTION OF A LASER BEAM FOR DRILLING WATCH JEWELS

BRIEF SUMMARY OF THE INVENTION

The invention relates to a device for the production of a laser beam for drilling watch jewels, the device comprising a laser resonator and a lens which focuses the beam of rays coming from the resonator on the watch jewel, the resonator including a rod of active material mounted between two reflectors and energized by means of a light source. In known devices of this type, the laser resonator has two spaced concave reflectors, whose spacing only slightly exceeds the length of the rod of active material. Exhaustive investigations have demonstrated that the use of a resonator of the above type is impractical for the drilling of watch jewels. A great deal of pumping energy is necessary for exciting the rod, resulting also in rapid exhaustion of the light source used for that purpose. Mass production with close tolerances on extremely small diameters of bore of 30 to 300 μ is not possible with the devices known up to the present.

These disadvantages are eliminated according to the invention by mounting the rod between two substantially planar reflectors and close to one of them, the distance between the reflectors being at least 10 times greater than the length of the rod.

BRIEF DESCRIPTION OF THE DRAWINGS:

FIG. 1 is a diagrammatic illustration of a device containing a laser resonator and a lens for the production of a focused laser beam;

FIGS. 2a and 2b are two diagrammatic representations of the ray path in a conventional laser resonator for two extreme operational instances;

FIGS. 3a and 3b are two diagrammatic representations of the ray path in the laser resonator according to FIG. 1 for the same two extreme operational instances;

FIG. 5 shows the ray path in one part of the lens and in the vicinity of the focal point making allowance for diffraction.

DETAILED DESCRIPTION

Figure 4:
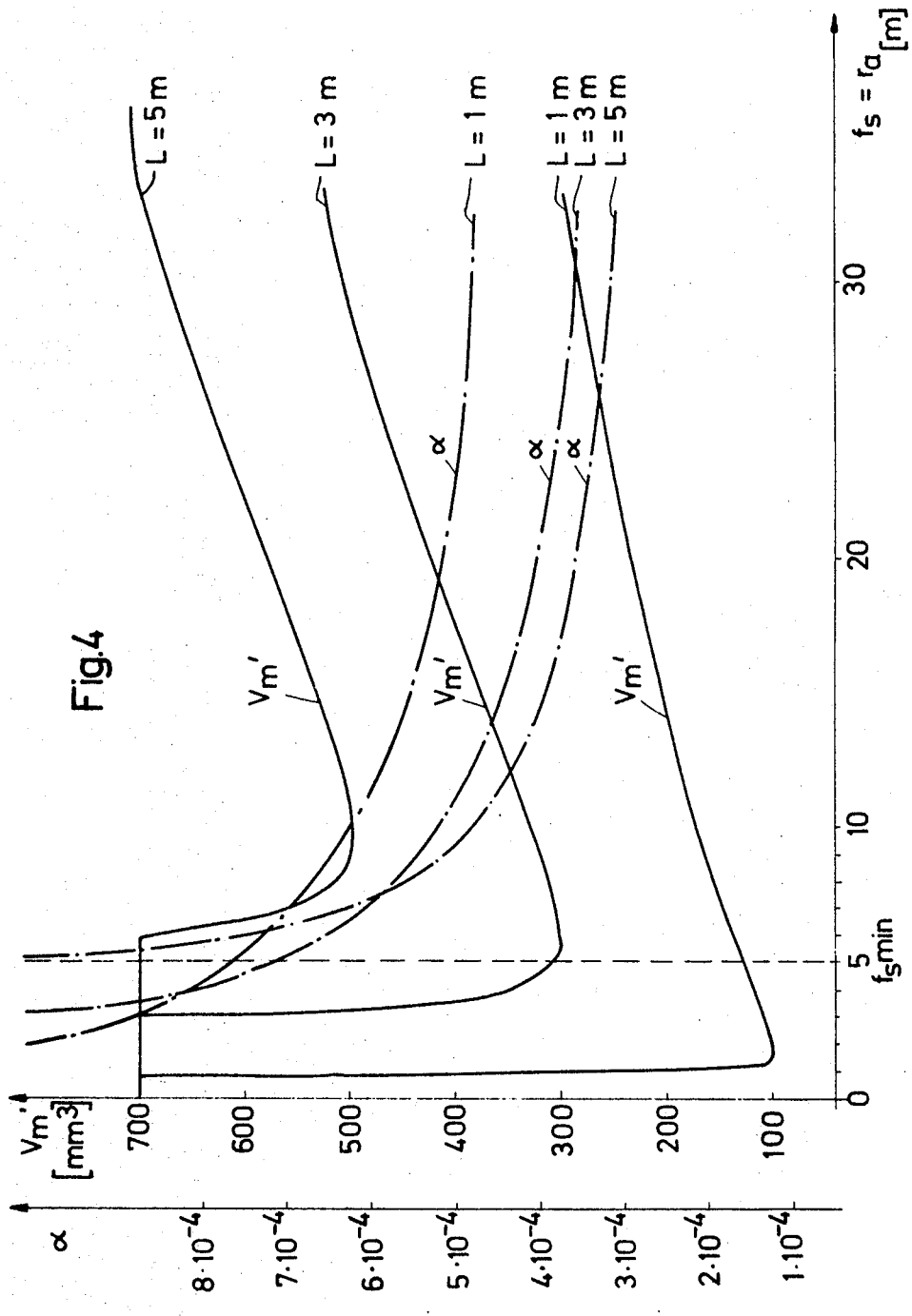
FIG. 4 is a graph showing the effect of heating the laser rod in laser resonators of the type depicted in FIG. 1.

The device shown in FIG. 1 comprises a laser generator 1 and a lens system 2. Laser generator 1 comprises a laser resonator 3 which consists of a rod 4 of active material, e.g. yttrium-aluminum garnet (YAG), and two planar mirrors or reflectors 5 and 6. Resonator length L, i.e. the distance between mirrors 5 and 6, is for example 3 m., while the length $l$ of rod 4 is for example 5 cm. with a diameter of 6.35 mm. The arrangement wherein L is much greater than $l$, in this case 60 times larger, is of essential significance in the present invention. L must be at least 10 times greater than $l$ and preferably 50 to 100 times greater. Rod 4 is quite close to reflector 5 and is positioned with respect to a light source 7 in an ellipsoidal cavity 8 of a hollow body 9 such that the light rays issuing from light source 7 are concentrated onto rod 4 by reflection from the silvered inside surface 10 of hollow body 9. Such a type of "laser head" constituted by elements 4–10 is well-known, subject to distinctions to be enumerated hereafter.

For energizing the light source 7 a conventional exciter unit 11 is used, connected to a power supply and containing a condenser, which discharges through the light source 7, whereby either a single discharge or a series of discharges can be obtained, as desired, the discharge frequency and discharge power being adjustable. The exciter unit is also controlled by an instrument 12 which measures the energy of the laser beam 13 emerging from reflector 6 which exhibits a certain transmissivity, while a small portion 14 of beam 13 is reflected by means of a faintly reflecting speculum 15 and directed to the instrument 12.

Lens system 2 is composed of a system 16 of constant focusing lenses and an interchangeable, telescopic front lens system 17. The focusing system 16 consists of a dispersing lens 18 and a condensing lens 19, and the telescopic system consists of two condensing lenses 20 and 21. The distance f of focus F of lens system 2 from its principal plane $h$ on the exit side is the variable focal length of the lens system which can be altered by interchange of system 17. In the case illustrated, the diameter of the beam 13 is magnified by the telescopic system, the consequence of which is that the aperture angle $\beta$ of the beam focused F is comparatively large and the focal length f is comparatively small. If the telescopic system 17 is inserted inversely in the ray path, the diameter of beam 13 will be reduced so that the aperture angle $\beta$ becomes smaller and the focal length $f$ on the contrary becomes larger. Further telescopic systems 17 are provided with a different magnification ratio of the cross-sectional areas of the beam, so that the aperture angle $\beta$ and focal length $f$ can be set to correspond with the required diameter of the hole to be bored.

A device (not illustrated) can bring one jewel after the other into the vicinity of focal point F and lock it thereat until a hole has been bored in the jewel by the focused beam 13,' e.g. by two ray pulsations.

To explain the special features of the specified device, it is necessary first to consider the construction and method of operation of the laser resonator hitherto employed for drilling watch jewels. One such resonator 22 is shown in FIGS. 2a and 2b. The resonator exhibits a rod 23 of active material and two concave mirrors 24 and 25; the distance between mirrors 24 and 25 in the drawing is assumed to be about 4 times larger than the length of rod 23. In reality the resonator length is as a rule only slightly larger than the length of the rod, as it is customary to fasten the mirror 25 directly to the laser head in which mirror 24 and rod 23 are disposed. FIG. 2a shows the course of a beam diagrammatically, that is reflected back and forth between mirrors 24 and 25 during an individual ray pulse and thereby amplified in the "cold" rod 23 at room temperature, into which energy is "pumped" by a light source.

Equiphase surfaces of the light vibrations are denoted by 26, the concave mirrors 24 and 25 here synchronizing with two such surfaces. $26_0$ denotes a plane surface of equal phase. Surface lines 27 of the beam represent lines on which the vibrational intensity is equal to $1_2/e$ of the vibrational intensity on the axis of the beam, while this latter intensity varies against a beam diameter approximately in correspondence to a Gaussian bell-shaped curve. The portion of the beam lying inside the rod 23 has a volume $V_m$ called the mode volume. This volume $V_m$ is essentially involved in the excitation and amplification of the laser rays and can be maximally equal to the plotted volume $V_o$ of rod 23, that is, in a laser resonator with plane mirrors. Rod 23 is plotted with reduced diameter so that its surface lines likewise correspond to a drop of vibrational intensity to the fraction $1_2/e$ of the vibrational intensity on the axis. The maximal mode volume $V_o$ of the rod is smaller than the real volume of rod 23 by a factor k of about 0.5.

If radiation pulses with higher pulse sequence frequency are produced consecutively, rod 23 becomes extremely heated by pumping light, whereupon as a consequence of the normal, cooling on the surface of the rod, the central part of the rod becomes warmer than its outside surface. The result of this is that the ends 28 of rod 23 curve outward, as shown at 28' in FIG. 2b, and the rod 23' thus deformed endwise now acts as a biconvex lens. The surface lines 27' of the beam are now no longer bounded by the plotted effective diameter of rod 23, but by the diameter of mirrors 24 and 25. The lens effect results in an expansion of the path of rays, because the beam corresponds to that zone in which the rays can be reflected back and forth between the mirrors 24 and 25. As may be seen, the mode volume $V_m'$ of the heated rod is much less than the mode volume $V_m$ of the cold rod. The energy which is pumped into the part of rod 23' not occupied by mode volume $V_m'$ is not utilized. In order to pump sufficient energy into the small mode volume $V_m'$, a brighter light source and a more powerful exciter unit has to be provided and much more energy employed than might be necessary for each individual pulse with a cold rod in itself.

Denoting the focal length of the lens formed by the heated rod 23′ as $f_s$, the resonator 24, 23′ 25 can be replaced by an equivalent planoconcave resonator 24*, 23, 25, including the still undeformed rod 23, where however mirror 24 with radius of curvature $r_0$ is replaced by an equivalent mirror 24* of radius $r_a$, for which $$r_a = \frac{r_0 \cdot f_s}{r_0 + f_s}$$

The action of the lens is now integrated into the equivalent mirror 24*. Properly considered, a replacement mirror ought also to be taken into consideration for mirror 25. In practice, however, the lens acts only on the directly contiguous mirror 24. It has been experimentally established that with the rod 23 in FIG. 1, $f_s$ can vary between ∞ (cold state) and $f_{s_{min}} = 5$ M. (hot state). It can be calculated that with conventional resonators according to FIGS. 2a and 2b the mode volume $V_m'$ of the fundamental mode in the hot state amounts to only about 2 to 5 percent of $V_0$.

FIGS. 3a and 3b show the path of rays with the resonator 5, 4, 6 according to FIG. 1 with cold or hot rod 4 or 4′, with which, however, having regard to the size of the drawing, the ratio L : l is shown much smaller than it is in reality. In the cold state the beam is cylindrical and all phase surfaces 29 are planar. Mode volume $V_m$ has the maximum value of $V_0$. In the hot state of rod 4′ the phase surfaces 29′ are slightly curved, but the phase surfaces $29_o'$ coincident with mirror 6 are planar. Mode volume $V_m'$ of the fundamental mode is of the same order of magnitude as the maximum mode volume $V_0$. Combining the action of lens of focal length $f_s$ composed of the hot rod 4′ with the action of mirror 4, an equivalent mirror 5* is obtained whose radius of curvature $r_a = f_s$. When heated, the resonator can immediately be regarded as a planoconcave resonator 5*, 4, 6 with undeformed rod 4.

In FIG. 4 the mode volume $V_m'$ of the fundamental mode in cubic millimeters is shown as a function of the focal length $f_s = r_a$ corresponding to the state of heating of rod 4′, and specifically for the effective resonator length L=3 m. and for two further assumed lengths of L = 1 m. and 5 m. respectively. Rod 4 of 5 cm. length and 6.35 mm. diameter has a true volume of approximately 1,400 mm.[3], the maximum mode volume $V_0$ accordingly amounts to about 700 mm.[3].

Clearly in all three cases the mode volume $V_m'$ for $f_s$ greater than 5 m. increasingly determines a quite considerable portion of the maximum mode volume $V_0$. For L=3 m. and L=5 m. this portion is larger than 40 percent. Moreover, for the same parametric values L=1, 3 and 5 m. the divergence α of beam 13 is shown as a function of the focal length $f_s = r_a$. Beyond mirror 6, with which the phase surface $29_o'$ (see FIG. 3b) is plane, the beam 13 is of course not cylindrical but slightly divergent, as shown in FIG. 5 which shows the focusing lens system 16 on a larger scale. In FIG. 5, the ("Gaussian" ) linear path of rays is shown in broken line, while the solid lines 30 represent the configuration of the beam conditioned by diffraction. The divergence α is half of the aperture angle of beam 13. In order to calculate divergence α, the planoconcave resonator 5*, 4, 6 must be replaced by an equivalent confocal resonator with two concave mirrors separated from each other by a distance equal to their radius of curvature. As a detailed illustration of the theory pertaining hereto would lead too far afield, FIG. 4 shows only the essential result thereof, that is to say above the boundary of $f_{s_{min}} = 5$ m. the divergence α of the maximum possible practical rod deformation is extremely small.

For $L = f_{s_{min}} = 5$ m. α of course tends to infinity, that is, the resonator becomes unstable. This is also clear from the known general stability condition for a resonator, namely $$0 < \left(1 - \frac{L}{r_1}\right)\left(1 - \frac{L}{r_2}\right) < 1$$

where $r_1$ and $r_2$ are the radii of curvature of the two mirrors and L the distance between them. For the planoconcave equivalent resonator under consideration $r_1 = r_a$ and $r_2 = \infty$ whence $$0 < \left(1 - \frac{L}{r_a}\right) < 1$$

From this $r_a$ must be greater than L. As $r_a = f_s$, the resonator of length L=5 m. becomes unstable, since upon maximum heating of the rod $r_a = f_{s_{min}} = 5$ m.

By applying the above-mentioned theory of the equivalent confocal resonator, one can still investigate for what length L, the mode volume $V_m'$ becomes maximum in the hot state. For this case, the following relationship holds:

$$d = \sqrt{\frac{L \cdot \partial}{\pi}\left(\sqrt{\frac{f_{s_{min}} - L}{L}} + \sqrt{\frac{L}{f_{s_{min}} - L}}\right)}$$

where d is the diameter of the rod now reduced to volume $V_o$, and λ is the wavelength of the light oscillation. With the rod 4 in FIG. 1, when $f_{s_{min}} = 5$ m. the distance L becomes about 4 m. Instead of this theoretically optimum distance, L=3 m. was chosen, so as to avoid absolutely any entry into the vicinity of the unstable region.

Referring again to FIG. 5, it should be particularly noted that the distance p of focus F from the last objective lens 19 is larger than the focal length f of the objective. This is attributable to the fact that the final lens of lens system 2, i.e. the condenser lens 19, is installed after the dispersing lens 18. It is extremely important that the distance p, even with a small focal length f, should always be large enough to avoid any material from splattering, when drilling the hole, and contacting the last lens to foul the same.

Figure 6:
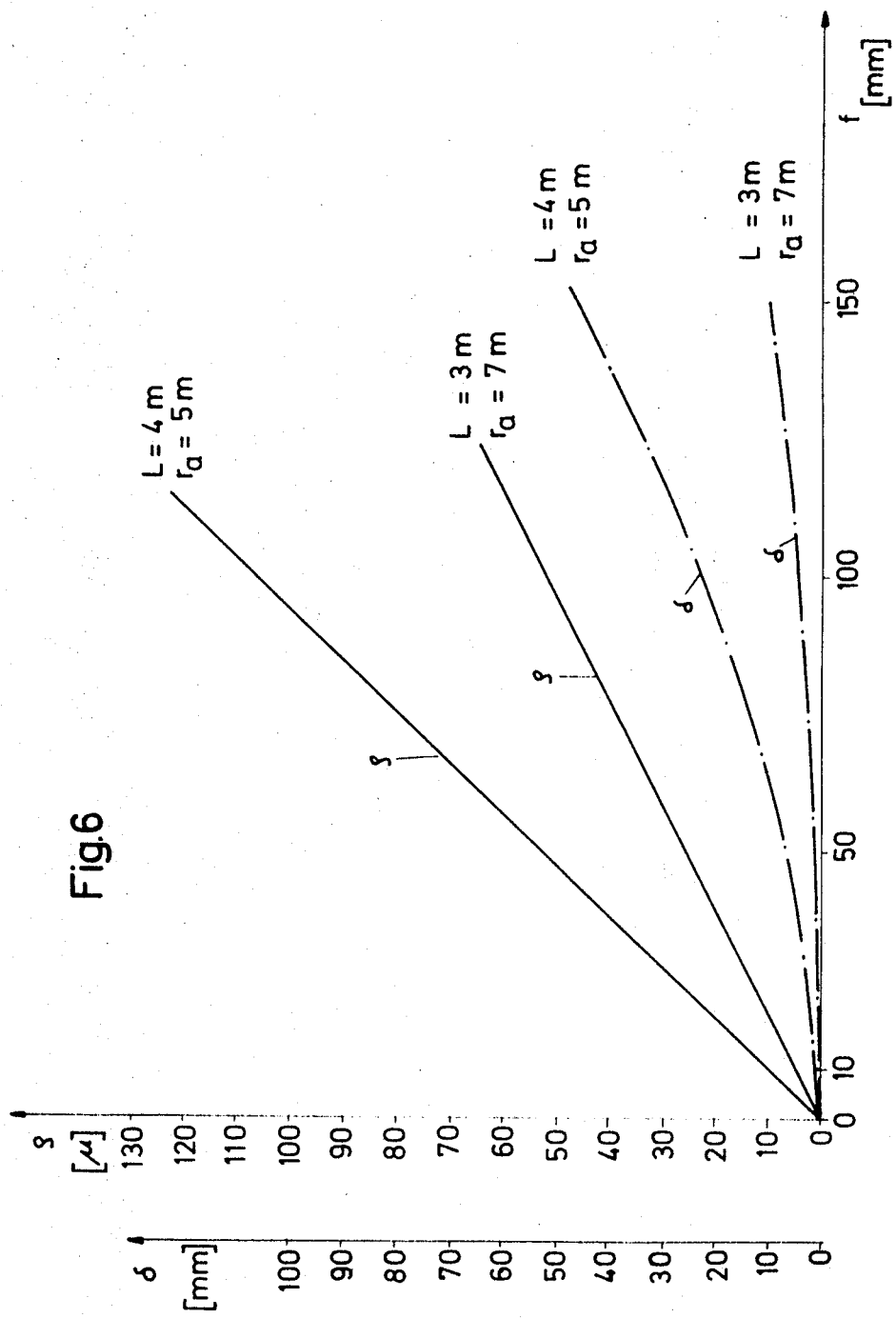
FIG. 6 is a graph showing the effect of the focal length of the lens on the radius of the focal point and the roundness and parallelism of the hole.

In the region of focus F, the lines 30 in a particular areas 31, the so-called caustic area, are nearly parallel to the beam axis. For diameter ρ of the focused spot bounded by caustic 31, $\rho = 2\alpha \cdot \alpha \cdot f$, and it is accordingly of extraordinary importance that divergence α be extremely small when very small holes are to be bored, for example holes of only 30 μ diameter. With the conventional resonators discussed in the light of FIGS. 2a and 2b, the divergence α becomes much too large, unless one is ready to accept a very unsatisfactory, i.e. very small mode volume $V_m'$. The smallness of divergence α is also essential to the perfect cylindrical shape of the bored hole. The length of the focal spot area is denoted by δ, where the distance of caustic 31 is at the most 5 percent larger than the focal spot diameter μ. FIG. 6 shows μ and δ as functions of focal length f for two planoconcave equivalent resonators with L=3 m., $r_a = 7$ m., and L=4 m., $r_a = 5$ m. respectively. The reason for choosing $r_a = 7$ m. and not $r_a = 5$ m. for the resonator with L=3 m., is due to the loading of resonator 3 of FIG. 1 not going so far as to make $r_a = f_{s_{min}}$ and therefore not heating rod 4 to the limiting temperature still established as practically feasible.

From the foregoing discussions it follows that resonator 3, as specified, possesses very essential advantages for watch jewel boring over conventional resonators with concave mirrors spaced close together.

Less energy is required for its excitation and in fact the energy required is only about 10 percent of the energy required up to the present, as is shown from the ratio of the mode volumes $V_m'$ taken into consideration. Likewise, the light source 7 and the exciter unit 11 can be substantially smaller than in the past. If the same light source 7 is used, its useful life will be far longer. Divergence α of the beam 13 is exceedingly small, so that it is possible to bore comparatively long, narrow holes. Beam 13 is exceedingly stable, so that the size and shape of the holes is identical in all jewels. The device described, furthermore, makes it possible for the first time to permit mass production, e.g. on a scale of 500,000 holes a day, with diameters varying, as required, between 30 μ and 300 μ the diametral tolerance of the drilled holes being extremely low, e.g. ±5μ, the cylindrical shape of the holes also being excellent. Obviously the laser energy, pulse length, pulse repetition frequency, number of pulses per hole and the focal length $f$ of lens system 2 have to be governed and/or adjusted according to the dimensions of the hole to be bored and the material of the jewels (ruby in most cases), and the operation of the exciter unit, i.e. excitation of the light source is automatically terminated by the jewel-feeding device each time a jewel comes into the focal area.

It may further be mentioned that because of the great spacing L between the planar mirrors 5 and 6, resonator 3 amplifies only transverse modes of a very low order. In a resonator with planar mirrors, but spaced at very short distance from each other, the before-mentioned advantages would be no longer attainable than with the double-concave mirrors discussed.

Although the device described is intended specifically for boring holes which pass right through watch jewels, it is possible to use it also for drilling other workpieces which may be of metal or a dielectric material, and possibly pocket-drillings could also be produced. Among other things, it is of course possible to drill bearing jewels for precision measuring instruments. Clearly, in principle, extremely minute deviations of mirrors 5 and 6 from a perfect plane can be tolerated; in practice, however, the mirrors will be made as perfectly planar as possible, particularly as this is more advantageous from a constructional viewpoint than the production of concave or convex mirrors.

It is further pointed out that with respect to the avoidance of variations of beam energy at the focal point caused by variations of the exciter output or performance, it is advantageous to select the mirror spacing L such that it is equal to half the focal distance of the lens formed by deformation of the rod for a predetermined median load thereof. In FIG. 4, it can be seen that when these conditions are respected, operation takes place substantially at the minimum of curves $V_m'$. For example, for $f_s = 6$ m., the mirror distance $L = 3$ m. must be selected. At this position, it is true that the active mode volume $V_m'$ for a given rod length is smallest, but since the mode volume and the divergence are also in this case more favorable by a multiple than with a smaller mirror distance ($L > 10$), this is negligible in comparison with the advantage of avoiding energy variations at the drill location. Additionally, by respecting the above condition, it is also possible to substantially reduce variations of the diameter of the caustic at the focal point by positioning the rod 4 adjacent to the mirror 6 at the beam exit (rather than adjacent to the mirror 5). Of course in this case, the light source 7 must not be on the same axis as the rod 4 but rather, in known manner, parallel thereto.

WHAT IS CLAIMED IS:

1. A device for the production of a laser beam for drilling watch jewels, said device comprising a laser resonator to produce a beam of rays and a lens system to focus the beam of rays from the resonator onto a watch jewel, said resonator including two spaced reflectors, a rod of active material mounted between said reflectors and a light source for energizing said rod, said reflectors being substantially planar, the rod being mounted close to one of the reflectors, the reflectors being spaced a distance at least 10 times greater than the length of the rod.

2. A device according to claim 1 wherein the spacing between the reflectors is 50 to 100 times greater than the length of the rod.

3. A device according to claim 1 wherein said rod undergoes heating and deformation during use, said rod having a measurable mode volume which, under maximum charge and shortest focal length of the lens formed by deformation of the rod is at least 40 percent of the mode volume of the undistorted rod.

4. A device according to claim 1 wherein said rod undergoes heating and deformation under use, said beam of rays having a divergence of less than $8 \times 10^{-4}$ under a working charge.

5. A device according to claim 1 wherein the spacing between the reflectors is about 3 m. and the length of the rod is about 5 cm. and the diameter of the rod is from 6 to 7 mm.

6. A device according to claim 3 wherein the spacing between the reflectors is equal to or somewhat smaller than the distance required for maximum mode volume of the heated rod.

7. A device according to claim 1 wherein said lens system comprises a focusing system including a condenser lens and a dispersion lens in front of the condenser lens a distance such that the distance from the condenser lens to the focus is longer than the focal length of lens system.

8. A device according to claim 7 wherein said lens system further comprises a telescopic system interchangeably located between said resonator and said focusing system.

9. A device according to claim 3 wherein the spacing between the reflectors is equal to half the focal distance of the lens formed by deformation of the rod with the rod carrying median load.

10. A device according to claim 9 wherein the rod is positioned adjacent to the reflector at the exit of the beam of rays.

* * * * *